United States Patent [19]

Goebel et al.

[11] Patent Number: 4,672,011

[45] Date of Patent: Jun. 9, 1987

[54] ELECTROCHEMICAL CELL HAVING COUPLING MEMBERS WITH RADIAL CHANNELS

[75] Inventors: Franz Goebel, Sudbury; Peter B. Harris, Dedham; Gerard H. Boyle, Concord; Roger K. Freeman, Boylston, all of Mass.

[73] Assignee: GTE Government Systems Corporation, Waltham, Mass.

[21] Appl. No.: 743,188

[22] Filed: Jun. 10, 1985

[51] Int. Cl.⁴ .................. H01M 2/24; H01M 6/46
[52] U.S. Cl. ......................... 429/158; 424/118; 424/155
[58] Field of Search .................. 429/118, 152–155, 429/158

[56] References Cited

U.S. PATENT DOCUMENTS

| | | | |
|---|---|---|---|
| 2,092,757 | 9/1937 | Groeniger | 137/849 X |
| 4,283,470 | 8/1981 | Freeman et al. | 429/209 |
| 4,287,273 | 9/1981 | Harney et al. | 429/153 |
| 4,446,211 | 5/1984 | Goebel et al. | 429/110 |
| 4,535,038 | 8/1985 | Boyle et al. | 429/154 |

Primary Examiner—Brian E. Hearn
Assistant Examiner—Stephen J. Kalafut
Attorney, Agent, or Firm—J. Stephen Yeo

[57] ABSTRACT

A electrochemical cell has a generally cylindrical battery stack comprised of disc-shaped components including atlernating first polarity electrodes and second polarity electrodes. Pairs of first polarity electrodes are coupled by ring-shaped couling members. The coupling members include radial channels such as grooves which allow the passage of a liquid cell component from a central well into the battery stack.

4 Claims, 2 Drawing Figures

ELECTROCHEMICAL CELL HAVING COUPLING MEMBERS WITH RADIAL CHANNELS

BACKGROUND OF THE INVENTION

The United States Government has rights to this invention under Contract F-33615-81-C2088.

REFERENCE TO RELATED COPENDING APPLICATIONS

Ser. No. 743,182, filed June 10, 1985, Electrochemical Cell Having Porous Metall Coupling Members and Ser. No. 743,177 filed June 10, 1985, Electrochemical Battery Containing Unitary Flapper Valve pertain to subject matter related to that of the present application.

This invention pertains to electrochemical cells and, more particularly, is concerned with means to electrically and mechanically link electrodes in such cells.

Electrochemical cells usually have two sets of electrodes of different priorities and a liquid cell component. In order to increase the current capacity of a cell, a plurality of electrodes of a given polarity are connected together in electrical parallel. Difficulties in connecting the electrode occur when the electrode material is soft such as lithium or porous carbon.

Freeman et al in U.S. Pat. No. 4,283,470 "Anode Structure for an Electrochemical Cell" describes an anode structure including a resilient contact member secured to a lithium disc by barbs. The contact member is generally circular and has a central hole rimmed with teeth. The anode structure can be stacked on a central tube, with the teeth locking the anode structure in place. While this arrangement has performed satisfactorily, electrical communication between anodes relies on a tube which adds to cost and weight.

In reserve-type cells, the liquid cell component is held separate from the solid battery stack until activation.

It is an object of the invention to provide an electrochemical cell with coupling members which provide mechanical and electrical contact between like polarity electrodes while also allowing liquid cell components to flow into the battery stack.

SUMMARY OF THE INVENTION

Briefly, in an electrochemical cell, a set of discshaped electrodes of like polarity are connected together by metal rings having radial channels for passing a liquid cell component such as electrolyte. Electrodes of the opposite polarity are coupled together by the cell's housing.

DESCRIPTION OF THE INVENTION

Figure 1:
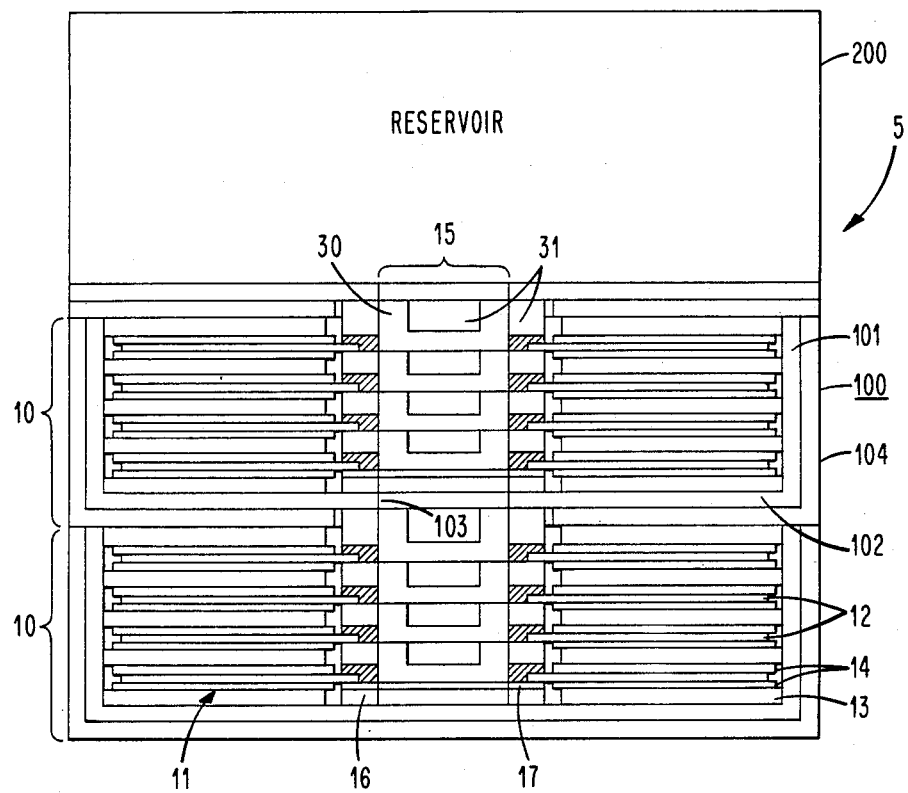
FIG. 1 cross-section view of battery of electrochemical cells embodying an aspect of the invention.

Turning first to FIG. 1, there is seen a battery 5 having electrochemical cells 10 embodying the invention. Each cell 10 includes a housing 100 containing a battery stack 11. For clarity, the thickness of the battery stack components is exaggerated.

The battery stack 11 includes first polarity electrodes 12 alternating with second polarity electrodes 13. Each set of electrodes of the same polarity are connected in electrical parallel. Adjacent first polarity electrodes and second polarity electrodes may be electrically separated and insulated from each other by interposed porous insulating sheets 14. The cell 10 is activated when the battery stack 11 is in contact with a liquid cell component. The cell may be stored with the liquid cell component stored in a reservoir 200, separated from the battery stack until activation. In high energy density cells, the first polarity electrodes may be lithium metal, and the second polarity of electrodes may include porous carbon on a metal substrate. The liquid cell component may be a solution of thionyl chloride and lithium tetrachloroaluminate. The porous insulating sheets 14 may be made of glass fibers.

The battery stack illustrated is generally cylindrical with the electrodes 12, 13 and insulating sheets 14 formed as discs with central holes. Housing 100 has a generally cylindrical metal side 101 and a flat metal bottom 102. The center of the battery stack include, a coaxial void known as a well 15 through which the liquid cell component may be introduced to the battery stack 11 from reservoir 200.

Figure 2:
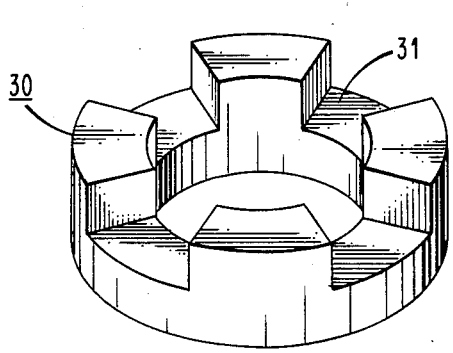
FIG. 2 illustrates a coupling member used in the cells of FIG. 1.

As a feature of the invention, channelled coupling members 30 made in the form of flat ended metal rings are located between adjacent pairs of first polarity electrodes to make both electrical and mechanical contact. The channeled coupling members 16 allow the liquid cell component to enter the battery stack from the well. A channeled coupling member 30 is seen best in FIG. 2. The radial channels may be grooves 31 in a flat surface of the ring.

Returning to FIG. 1, the first polarity electrode disc 12 is alternately arranged with the second polarity electrode disc 13. Thin porous insulating sheets 14 are interleaved between adjacent electrode discs.

The first polarity electrode discs 12 have a smaller inside and outside diameter than the second polarity electrode discs 13. The coupling members 30 are arranged in contact with the inner edge of first polarity electrode disc 12 but not with the second polarity electrode discs 13. The outer edge of the second polarity electrodes 13 make contact to the housing side 101. The coupling members 30 should have about the thickness of second polarity electrodes 13 and two insulating sheets 14. The bottommost coupling member is insulated from the bottom 102 of housing 100 by an insulating disc 16.

Each housing 100 is topped with a cover. If two or more cells are connected in electrical series to form a battery, the cover may be the bottom of the next higher cell housing. In this situation, wells in adjacent cells are coupled by a hole 103 through the intermediate housing bottom. The first polarity electrodes of the lower cell are electrically coupled to the housing of the upper cell either by a compression or welded contact. In the case of a compression contact, a resilient member 17 such as a spring wave washer urges the coupling members upward against the metal bottom of the next higher cell housing. The cell housings of adjacent cells are electrically insulated from each other, and may have a plastic coating 104 for insulation.

Having described the preferred embodiment of the invention, we claim:

1. An electrochemical cell comprised of:
   a generally cylindrical housing having flat bottom and a side wall, wherein at least the inner surface of said housing is electrically conductive;

a plurality of generally disc shaped first polarity electrodes having outer edges spaced from said side wall;

a multiplicity of generally flat ended ring shaped metal coupling members having radial liquid passing channels, at least one coupling members interposed between and in electric contact with each pair of adjacent first polarity electrodes whereby said first polarity electrodes are in electrical communication with each other by means of said coupling member;

a plurality of generally disc shaped second polarity electrodes alternately interleaved with said first polarity electrode and spaced from said first polarity electrodes and said contact member, and having outer edges in electrical contact with the inner surface of said side wall, whereby said second polarity electrode structures are in electrical communication with each other by means of said cylindrical side wall.

2. The electrochemical cell of claim 1 which further includes:

a plurality of generally disc shaped spacing members of porous insulating material, at least one spacing member interposed between each pair of adjacent first polarity electrodes and second polarity electrodes.

3. The electrochemical cell of claim 2 wherein said coupling members have grooves.

4. A battery comprised of:

a. a stack of electrochemical cells, each cell comprised of:

a generally cylindrical housing having a bottom and a side wall, wherein at least the inner surface of said housing is electrically conductive;

a plurality of generally disc shaped first polarity electrodes having outer edges spaced from said side wall;

a multiplicity of generally flat ended ring shaped metal coupling members having liquid passing channels, at least one coupling member interposed between and in electrical contact with each pair of adjacent first polarity electrodes, whereby said first polarity electrodes are in electrical communication with each other by means of said coupling members;

a plurality of generally disc shaped second polarity electrodes alternating interleaved with said first polarity electrode and spaced from said first polarity electrodes and said coupling members, and having outer edges in electrical contact with the inner surface of said side wall, whereby said second polarity electrode structures are in electrical communication with each other by means of said cylindrical side walls;

b. means for electrically insulating the housing of each cell from the housing of the other cells; and c. meand for electrically coupling a coupling member to a bottom of a housing of an adjacent cell thereby connecting the cells in electrical series.

* * * * *